(12) United States Patent
Feinleib

(10) Patent No.: US 6,272,532 B1
(45) Date of Patent: Aug. 7, 2001

(54) ELECTRONIC REMINDER SYSTEM WITH UNIVERSAL EMAIL INPUT

(76) Inventor: Harold F. Feinleib, 33 Butternut Pl., Stamford, CT (US) 06903

( * ) Notice: Subject to any disclaimer, the term of this patent is extended or adjusted under 35 U.S.C. 154(b) by 0 days.

(21) Appl. No.: 09/203,840

(22) Filed: Dec. 2, 1998

(51) Int. Cl.$^7$ .................................................. G06F 13/00
(52) U.S. Cl. ........................ 709/206; 709/219; 709/313; 709/329
(58) Field of Search .................................. 709/202, 203, 709/204, 206, 217, 219, 313, 328, 329

(56) References Cited

U.S. PATENT DOCUMENTS

| | | | |
|---|---|---|---|
| 5,937,160 | * | 8/1999 | Davis et al. ........................... 707/10 |
| 5,960,406 | * | 9/1999 | Rasansky et al. ...................... 705/9 |
| 6,049,801 | * | 4/2000 | Whitmyer, Jr. ........................ 707/10 |

* cited by examiner

*Primary Examiner*—Viet D. Vu
(74) *Attorney, Agent, or Firm*—St. Onge Steward Johnston & Reens LLC

(57) ABSTRACT

An electronic reminder system is provided. The system includes a computer connectable to the internet for receiving email messages. The messages include at least one reminder message set, having a date, recipient and text. A program executing on the computer parses the email message and creates an reminder electronic message. The electronic reminders are preferably sent as email messages. If desired, the reminder may include an instruction to be carried out by a machine which receives the instruction.

21 Claims, 5 Drawing Sheets

ELECTRONIC REMINDER SYSTEM WITH UNIVERSAL EMAIL INPUT

FIELD OF INVENTION

The invention relates to systems which send electronic messages as reminders of critical dates.

BACKGROUND OF THE INVENTION

With the advent of digital electronics critical date systems kept on note cards and calendars, and in date books, have in many cases been replaced by digital electronic systems in which the reminder itself takes the form of an electronic message which pops up on the screen of a PDA, PC, or the like. A date range of reminders in the form of a calendar or list can typically be viewed on screen or in hard copy.

Often, reminder functionality is bundled together with contact management, personal information management and/or calendaring software. Project and/or property software generally does not provide such functionality. For example project/property management software may include critical date entry and tracking capability but have no ability to generate electronic reminders, and no ability to generate any reminders for delivery to third parties (e.g. change air filter to janitorial, review lease to legal).

The rise of network and internetwork computing has provided additional capabilities to electronic reminders in the form of email messages, and of sending reminders to third persons. Network computing permits reminder messages to be created on one PDA or PC, and pop-up on the PDA or PC of another person who has network access. Internetwork computing has provided the capability to send electronic reminders in the form of email messages means that possible recipients include any person with internetwork email access irrespective of the type, location or ownership of the PDA, PC or other hardware or software they use to obtain email access. This enables universal email output access to the email reminder, but reminders may not readily be scheduled for future delivery.

Proprietary email and/or groupware packages, e.g. MS Outlook and/or Exchange Server, often enable electronic and email reminder messages to be sent at some defined future time. To get a delayed delivery feature, however, a user must use the proprietary email system to compose the message. Also, only a single reminder may be arranged for each email message and there is no provision in these systems for entering a series of reminders relating to management of a single project.

Web-based systems for entering email reminders are also known (e.g. http://www.event-reminder.com) however these systems do not typically accept email input of reminders.

What is desired, therefore, is an electronic reminder system which permits universal email input of reminders. Also desired is a system which would enable a series of reminders, for example related to a single project, to be input with a single email message. The ability to issue commands to the system via email message would also be advantageous.

SUMMARY OF THE INVENTION

Accordingly, it is an object of the invention to provide a system which sends electronic reminders with the capability of receiving reminder input via a non-proprietary email message.

Another object of the invention is to provide an electronic reminder system in which a plurality of individual reminders may be input in a single email message.

A further object of the invention is to provide an electronic reminder system including features designed for project and/or property management.

Still another object of the invention is to provide an electronic reminder system which can be configured and controlled via commands issued in email messages.

These and other objects and advantages are achieved by an electronic reminder system comprising a computer connectable to the internet for receiving email messages via POP and/or SMTP. The messages include commands and/or at least one reminder message set. The reminder message set includes a date, recipient and text, but may also include a time, subject, and reminder resending dates. A program executing on the computer parses the email message and stores the reminder message set on a database or creates and queues the reminder electronic message(s). In the event reminder message sets are stored on a database, the program retrieves them at the appropriate time and constructs and sends the electronic reminder. The electronic reminders are preferably sent as email messages. If desired, the reminder may include an instruction to be carried out by a machine which receives the instruction.

DETAILED DESCRIPTION OF THE INVENTION

Figure 1:
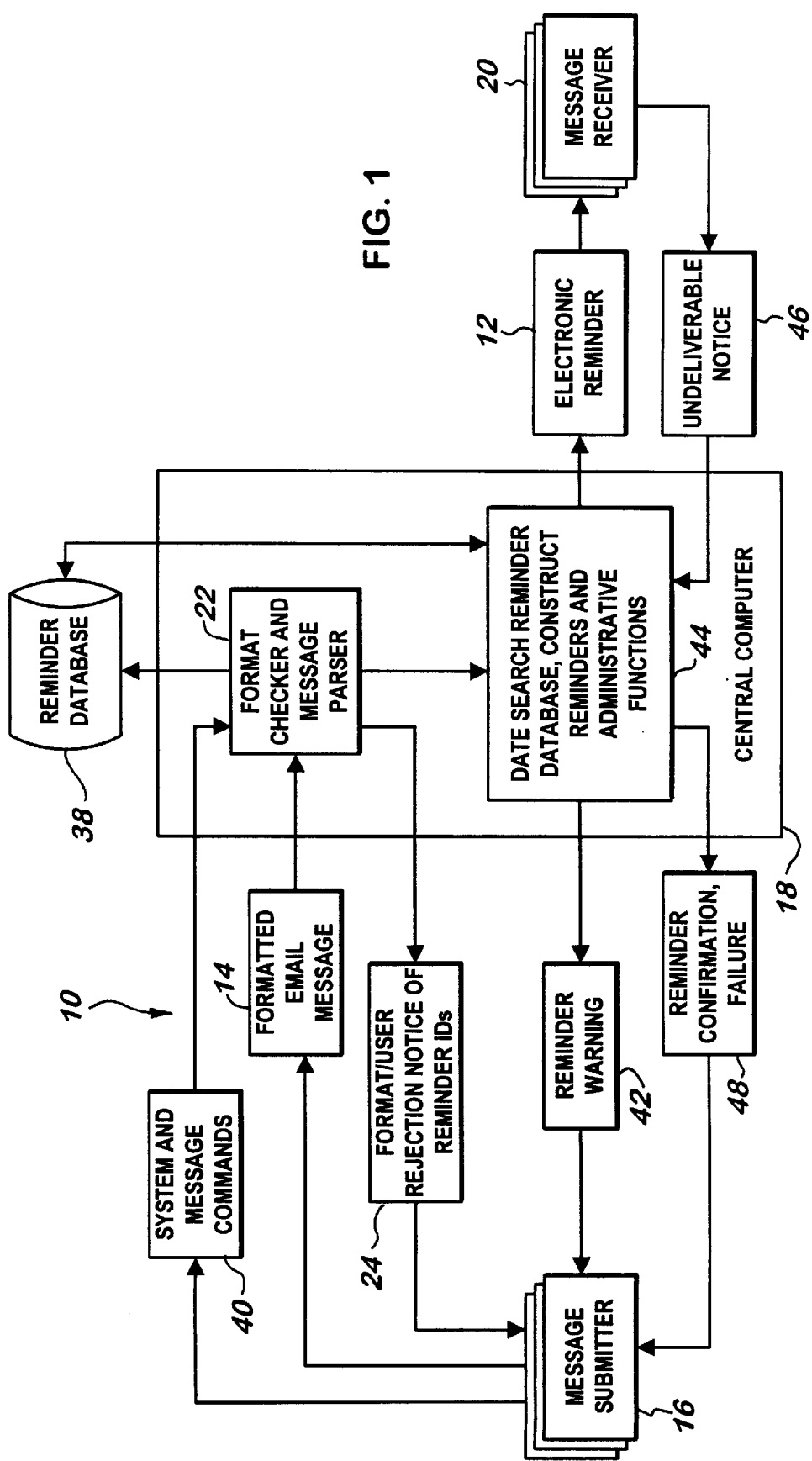
FIG. 1 is a functional block diagram depicting a system for universal email entry and electronic delivery of reminders in accordance with the invention.

An electronic reminder system 10 in accordance with the invention is illustrated in FIG. 1. System 10 generates electronic reminder messages 12 from universal, non-proprietary email message input 14. By "universal, nonproprietary" is meant that email message input to system 10 can be produced using any SMTP-compatible email program. It is understood that the invention is not limited to the SMTP standard, but is equally applicable to any electronic messaging standard.

A message submitter 16 submits email message 14 by wired or wireless link to central computer 16 for the purpose of reminding a message receiver 20 by wired or wireless link at some future time.

Email message 14 includes all the information necessary to generate and send electronic reminder 12 to the correct recipient at the appropriate time. Email message 14 may also include commands for configuring and controlling central computer 18 as well as manipulating individual reminders.

Central computer 18 may comprise an email server computer which receives all SMTP packets forwarded to a particular port at its IP address, or may comprise an email client computer which uses POP or IMAP to retrieve email messages addressed to it which are stored on an email server computer. In either case, central computer 18 includes a format checking and message parsing module 22 which receives email messages 14 for initial analysis. Module 22 preferably comprises software executing on computer 18, and is configured to examine each incoming email message 14 in one or more of numerous different ways. For example, module 22 may check to determine whether message submitter 16 is an authorized user, or whether submitter 16 has exceeded a predetermined limit on either the number of reminders he may have on the system or the total number of reminders the system may handle. If an error condition exists, computer 18 replies at 24 to submitter 16 with an appropriate error message. It is understood that module 22 may check for other error conditions.

Figure 3:
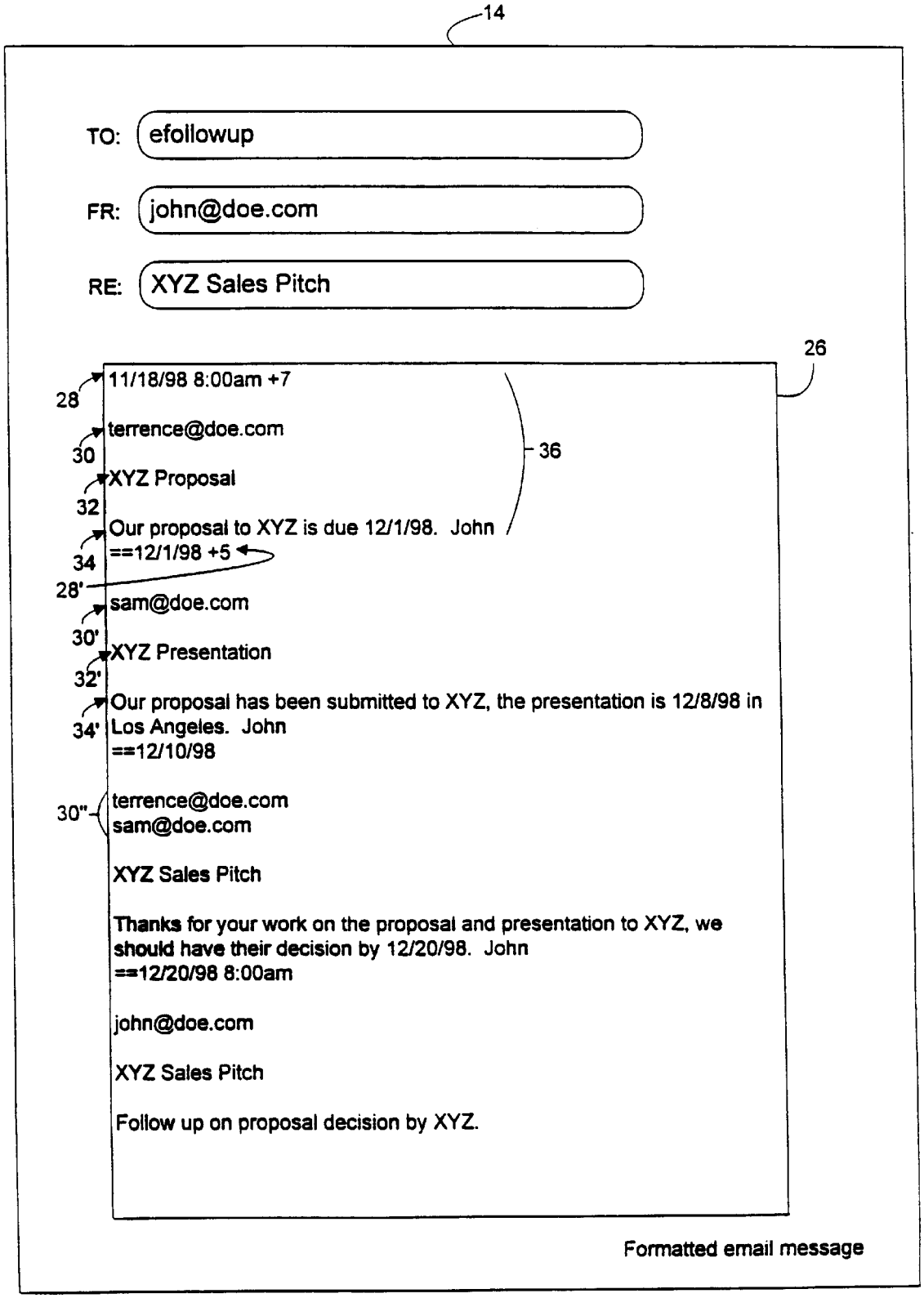
FIG. 3 is a schematic diagram depicting a formatted message as universal email input to the electronic reminder system of FIG. 1.

Assuming no submitter error condition exists, module 22 will parse the body of email message 14 in an attempt to identify the format configured into computer 18 for submitting reminder information. It is understood that many different formats are possible but the one used in early versions of applicant's follow-up® product is schematically illustrated in FIG. 3.

It is body 26 of email message 14 which includes the reminder information. First line 28 in body 26 includes the date and time to send the reminder together with the date to resend the reminder. In this regard, "+7" means the reminder is to be resent, a second time, 7 days after "Nov. 18, 1998". A blank line follows first line 28 to separate it from third line 30. Line 30 includes the address of the reminder recipient, in this case an email address. Additional recipients of the reminder would be listed one each on consecutive lines (see 30"). A blank line separator follows the list of email recipients. The fifth line 32 of message 26 includes the subject or "re:" line for reminder 12. A blank line separator follows line 32. A text for reminder 12 follows on lines 34 and until the symbol "==" or the end of the message. Again it is understood than module 22 could be configured for innumerable other different, but equally effective formats for transmitting reminder information by email message 14.

Lines 28, 30, 32 and 34 together form a reminder message set 36, as do lines 28', 30', 32'and 34'. An email message 14 may include one or more reminder message sets separated by "==" or some other delimiting symbol. If desired, it is understood that additional information such as a unique reminder ID, or the reminder sent may also be included in set 36. It is also understood that the only information necessary to include in set 36 is the date, recipient and text of electronic reminder 12.

Sets 36 are stored as records on reminder database 38 accessible by wired or wireless link to computer 18. It is understood that database 38 may be integrated with, on the same local network as, or remotely located from computer 18. It is also understood that database 38 may also comprise a queue of messages constructed from set 36 instead of a plurality of records formed from the sets themselves.

Software for parsing text files into units of data is known, as is software for parsing incoming email messages. The specifics of the operation of this type of software are accordingly not discussed in detail herein. If one or more reminder sets is identified in body 26 of email 14, then a unique identifier (ID) is assigned to each reminder. The reminder ID(s) are stored together with the set on database 38 and are reported at 24 back to submitter 16. If, however, module 22 is unable to identify a reminder set 36 in body 26 of email 14, or if the reminder date is in the past and so on, then a format error message is sent at 24 to submitter 16.

The unique reminder IDs are used to issue message specific commands 40 to computer 18. For example, submitter 16 may decide to cancel or change the delivery date for one or more reminders 12. Submitter 16 may do this by presenting computer 18 with the appropriate command together with the reminder ID. Examples of message specific commands include: list all my scheduled reminders by date, recipient or subject, change a specific reminder, add a recipient to a specified reminder, and delete a specific reminder. It is understood that many others are possible if additional controls are desired for individual reminder messages.

Preferably, commands 40 are issued to computer 18 via universal, non-proprietary email message, just like reminder information sets. In this regard, module 22 analyses and parses command message 40 to extract the command. If no command or reminder message set is identified by computer 18 in a received message, then a format error message 24 is returned to submitter 16.

In addition to message specific commands, computer 18 is also designed to be administered, controlled and configured by email commands as well. For example commands may be issued to add new authorized users; set the reminder limit for a user and/or the system; set the recipient limit for a reminder; configure acceptable email input formats; configure reminder options; configure the contents of the form field for email reminders as follow-up® or submitter 16; enable/disable particular system or message commands; and set whether submitters receive warning messages 42 and if so, how long before the reminder date. Use of one or more of these system commands may require a passcode authentication to reduce tampering, especially if computer 18 is setup to receive email via SMTP, as opposed to POP or IMAP. It is understood that system commands may be varied on a user basis with appropriate profiles or groups.

A program 44 executing on computer 18, receives commands 40 from module 22. It is understood that module 22 is preferably a part of program 44. Periodically, e.g. hourly, daily or the like, program 44 analyzes database 38 to determine if any reminders 12 and possibly also warnings 42 are due to be sent. If so, program 44 retrieves the record(s) from the database and constructs and sends reminders 12 which are preferably in the form of email messages (see FIG. 4). In the case where database 38 comprises a queue of messages, the messages will already have been assembled and all be sent by program 44 at the appropriate time as they reach the top of the queue If warnings are configured on computer 18 and/or for user 16, then a predetermined time before a reminder is due to be sent, a warning message 42 is sent to submitter 16 who may issue commands 40 to alter or delete reminder 12. Assuming no deletion command is issued and that program 44 makes any necessary changes to database 38, reminder 12 is constructed and sent on the due date after warning 42 has been issued.

If reminder 12 is returned undeliverable at 46 to computer 18, program 44 may use the reminder ID to retrieve the address of submitter 16 or may just pass the bounceback message along to the reminder submitter and forward the undeliverable notice 48 to the user who submitted it. Alternatively, if either no undeliverable notice is received in a specified time or if a delivery is returned to computer 14, program 44 will, if so configured, forward a delivery confirmation 48 to submitter 16.

It is understood that it is possible to create an electronic reminder system without database 38. Such a system is within the scope of this invention and would operate as follows. Module 22, upon parsing email 14, would pass reminder message sets 16 directly to program 44 which would construct and queue the electronic reminder in date, time order. Such a system would provide the basic functionality, but may make message and/or user-based commands difficult to implement. Similarly, warnings, confirmations and the like may be more difficult.

Figure 2:
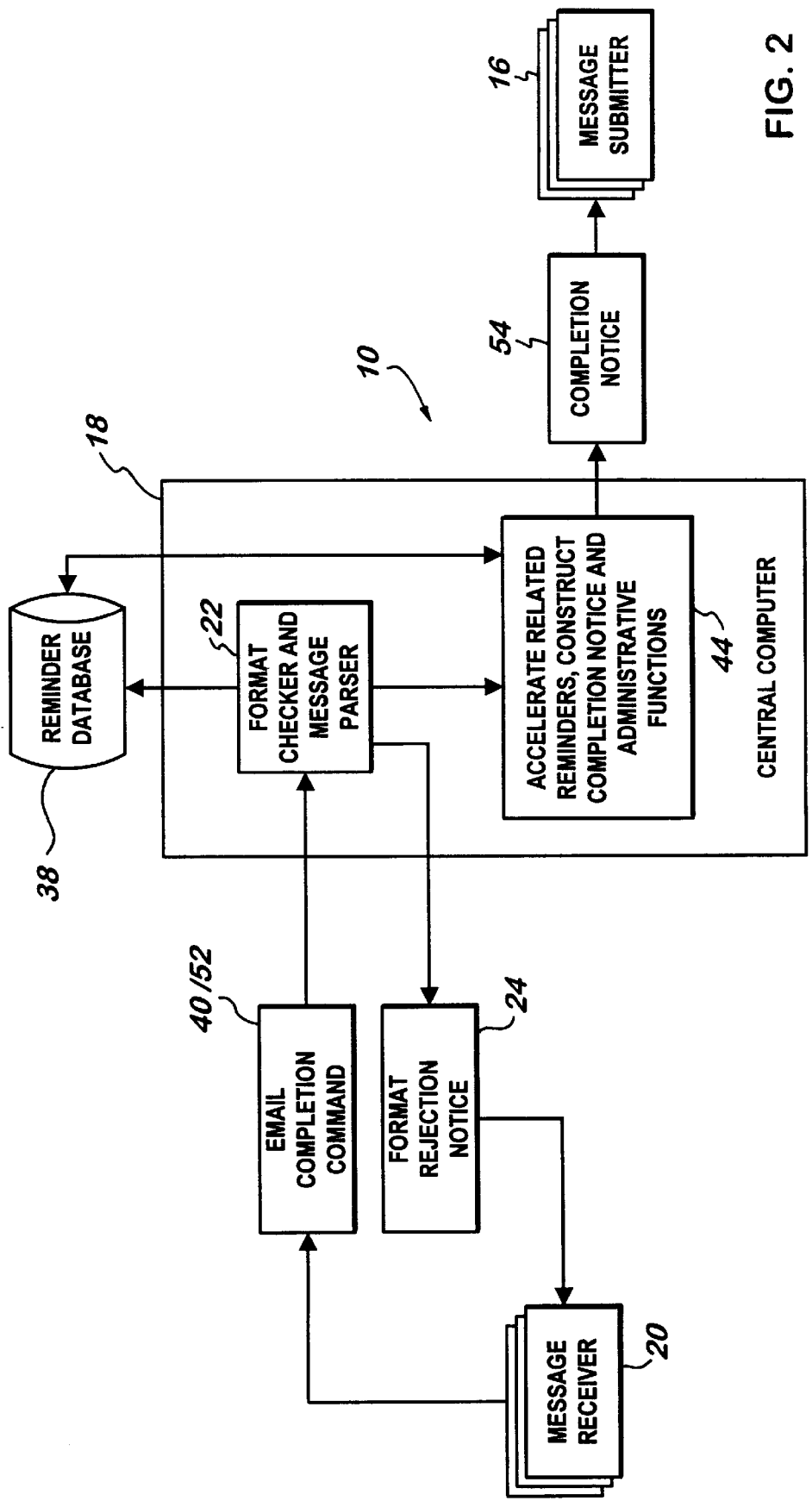
FIG. 2 is a functional block diagram depicting how completion notices and project management is accomplished with email commands in the electronic reminder system of FIG. 1.

Referring now to FIG. 2, once an electronic reminder 12 has been sent, system 10 and in particular program 44 incorporates some additional functionality to assist in project management. One of the commands 40 which is message specific is a completion command ("Complete"). This and other commands are invoked as schematically depicted in FIG. 5 by placing them on the first line 50 of an email 52 which also includes the reminder ID 38.

In this particular instance, email 52 is a reply to an electronic reminder 12, but it is understood that reminders 12 may also be marked complete by email from other persons, for example by the creator of the reminder John Doe even before the reminder is sent. In response to recognition by module 22 of the "Complete" command and a reminder ID 38, program 44 will send a completion notice to submitter 16 identified with reminder ID 38. If so configured, program 44 will also advance and/or delay the dates for all other related reminders entered into the system to move a project forward as soon as possible. It is understood that related reminders may be identified in many different ways, for example by a coded portion of reminder ID 38.

Program 44 may also be configured to alert all recipients of related reminders that a particular task has been completed. How this would work may be explained with reference to FIG. 3. Once Terrence marks his proposal reminder "Complete", Sam and John could be immediately, automatically notified that the Proposal has been completed by Terrence. This completion message could be sent to Terrence separately from or together with a date accelerated reminder for the Presentation. It is understood that commands may be created for virtually any type of project management function desired.

Figure 4:
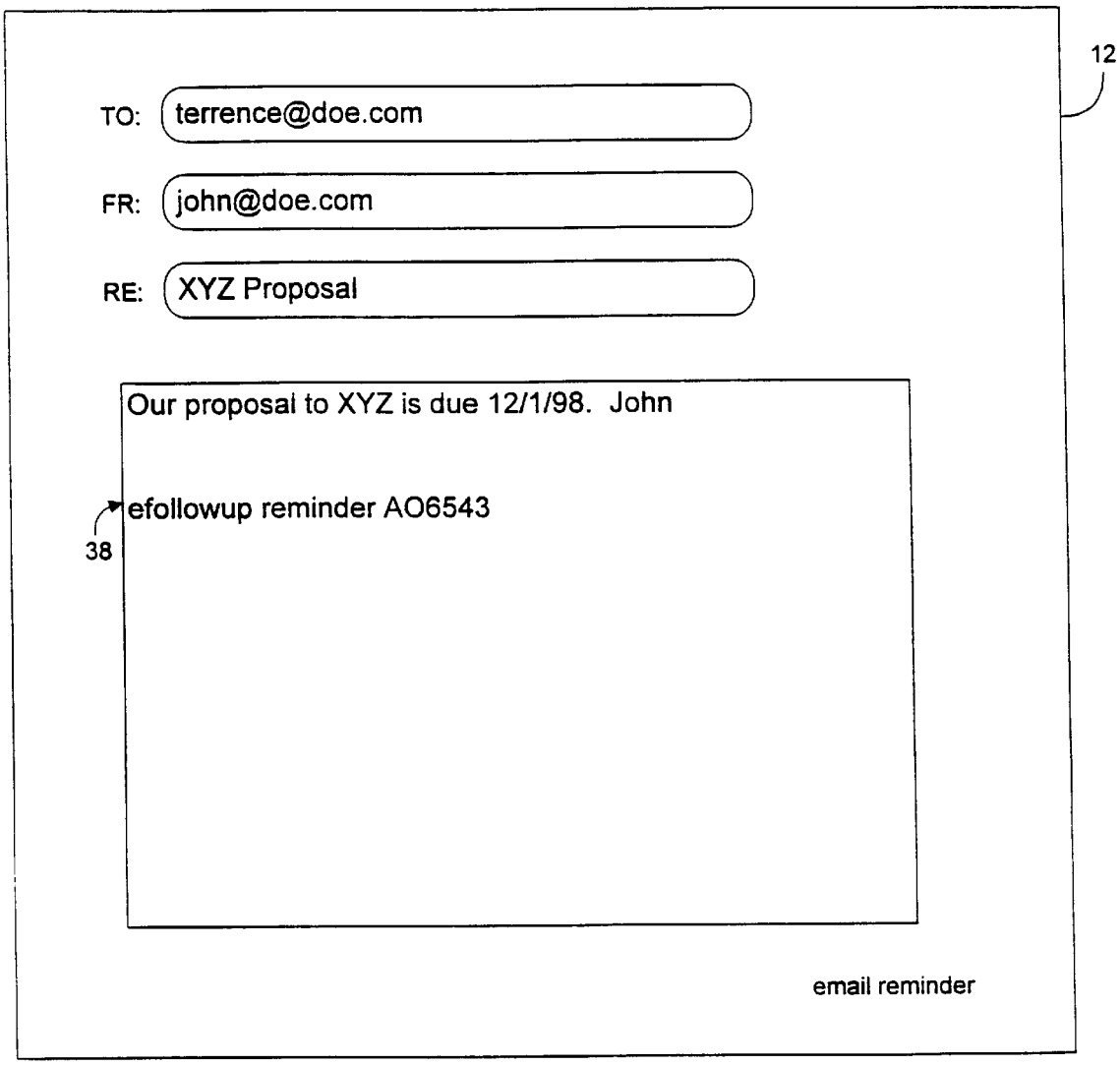
FIG. 4 is a schematic diagram depicting an email electronic reminder message generated by the electronic reminder system of FIG. 1 from the formatted email message of FIG. 3.
Figure 5:
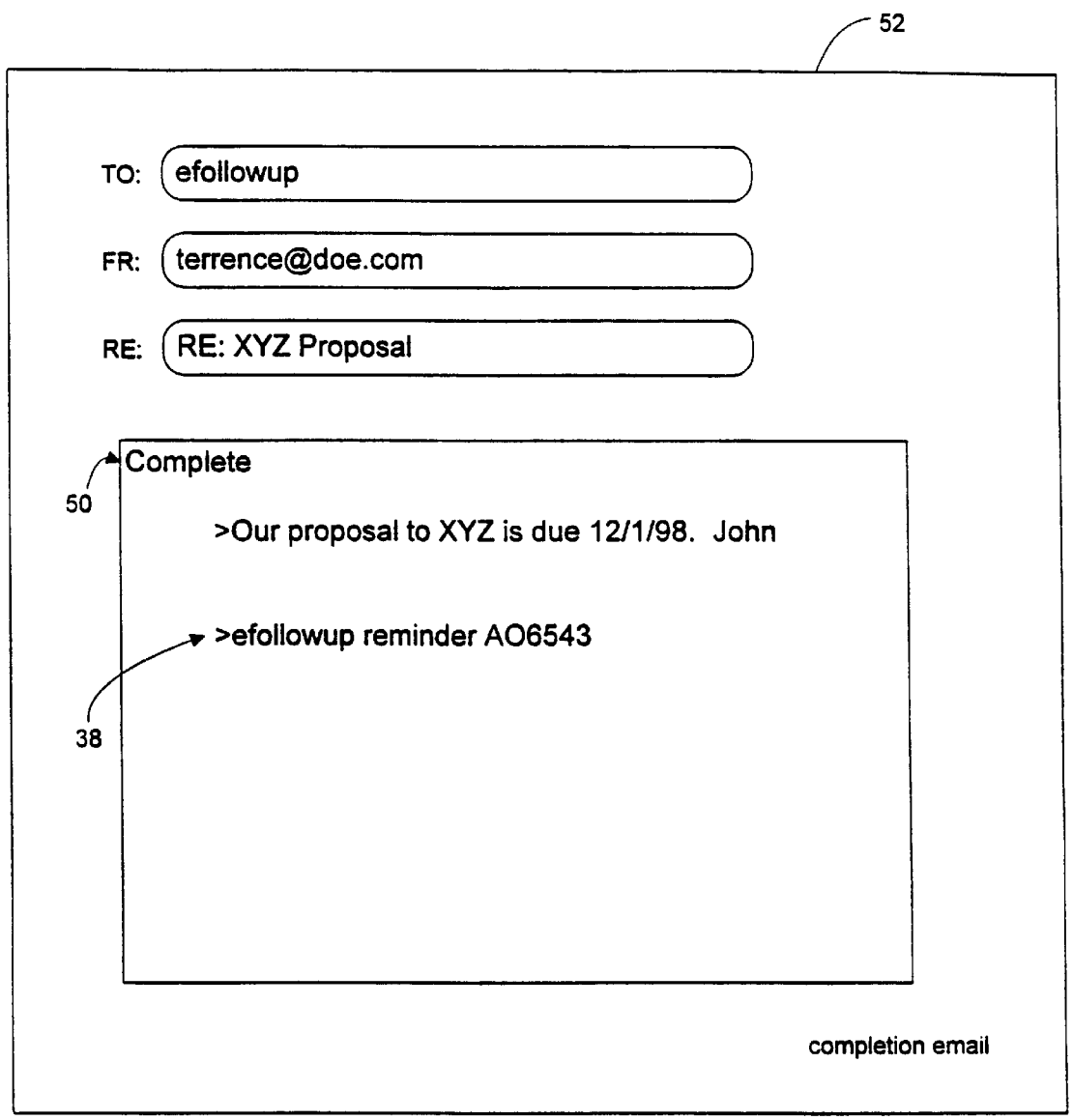
FIG. 5 is a schematic diagram depicting an email command issued to the electronic reminder system of FIG. 1 to provide project management.

Referring now to FIG. 1, in the examples provided in FIGS. 3–5, message receiver 20 was assumed to be a person. The invention, however, is not so limited. For example, receiver 20 may be a machine or piece of equipment which is being remotely monitored or controlled via electronic messages and/or email. System 10 may also be used for property/facility management in which case receiver 20 may be a thermostat, a light switch, or an on-site manager. In any case, electronic reminder 12 may include an instruction to be carried out by receiver 20.

Although the invention has been described with reference to a particular arrangement of parts, features and the like, these are not intended to exhaust all possible arrangement or features, and indeed many other modifications and variations will be ascertainable to those of skill in the art.

What is claimed is:

1. An electronic reminder system comprising:
    an email message containing at least one reminder message set;
    each said reminder message set including a recipient, a date and a text;
    a computer connectable to the Internet for receiving said email message;
    a data storage device accessible by said computer for storage and retrieval of database records; and
    a program executing on said computer for extracting each said reminder message set from said email message and for using each said reminder message set to create a database record on said data storage device;
    said program for retrieving the database record when a predetermined date matches the reminder message set date, for constructing an electronic reminder from the retrieved reminder message set text, and for sending the electronic reminder to the retrieved reminder message set recipient.

2. The electronic reminder system of claim 1 in which said electronic reminder is an email reminder.

3. The electronic reminder system of claim 1 wherein said computer is connectable to the internet for receiving said email message via POP.

4. The electronic reminder system of claim 1 wherein said computer is connectable to the internet for receiving said email message via IMAP.

5. The electronic reminder system of claim 1 wherein said computer is connected to the internet for receiving said email message via SMTP.

6. The electronic reminder system of claim 1 including a machine for receiving said electronic reminder.

7. The electronic reminder system of claim 6 wherein said electronic reminder is an instruction and in which said machine interprets and carries out the instruction contained in said electronic reminder.

8. The electronic reminder system of claim 1 wherein said email message contains a plurality of reminder message sets.

9. The electronic reminder system of claim 1 wherein said program checks a sender of received email messages for authorization and replies with an authorization error message if an error condition exists.

10. The electronic reminder system of claim 1 wherein said program checks a body of received email messages and replies with a format error message to a sender thereof if a reminder message set cannot be identified therein.

11. The electronic reminder system of claim 1 wherein said program is configurable to email a warning to a sender of said email message a predetermined time prior to sending said email reminder.

12. The electronic reminder system of claim 1 wherein said program is configurable to forward a reminder failure to a sender of said email message.

13. The electronic reminder system of claim 1 wherein said program is configurable to forward a reminder delivery confirmation to a sender of said email message.

14. The electronic reminder system of claim 1 wherein said program assigns a unique reminder ID to each reminder message set extracted from said email message.

15. The electronic reminder system of claim 14 wherein each assigned reminder ID is reported to a sender of said email message.

16. The electronic reminder system of claim 15 wherein the sender of said email message issues commands to said computer related to the assigned unique reminder ID.

17. The electronic reminder system of claim 1 wherein said program is controllable via email commands.

18. The electronic reminder system of claim 1 wherein said program is configurable to limit a total number of reminders on said date storage device for any single user.

19. The electronic reminder system of claim 1 wherein said program is configurable to limit a total number of recipients of any single email reminder.

20. The electronic reminder system of claim 1 wherein each said reminder message set includes a time to send the electronic reminder.

21. The electronic reminder system of claim 20 wherein each said reminder message set includes a second date for resending the electronic reminder.

* * * * *